United States Patent
Volle

(10) Patent No.: US 7,683,154 B2
(45) Date of Patent: Mar. 23, 2010

(54) EPOXY RESIN CURING AGENT OF POLYETHYLENE POLYAMINE-MONOGLYCIDYL ETHER ADDUCT AND AMINE COMPOUND

(75) Inventor: Joerg Volle, Selm-bork (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 12/094,328

(22) PCT Filed: Nov. 7, 2006

(86) PCT No.: PCT/EP2006/068194

§ 371 (c)(1),
(2), (4) Date: May 20, 2008

(87) PCT Pub. No.: WO2007/060091

PCT Pub. Date: May 31, 2007

(65) Prior Publication Data

US 2009/0005516 A1    Jan. 1, 2009

(30) Foreign Application Priority Data

Nov. 25, 2005    (EP)    ................... 05111293

(51) Int. Cl.
C08G 59/50    (2006.01)
C08L 63/02    (2006.01)
C08L 63/04    (2006.01)
C09K 3/00     (2006.01)

(52) U.S. Cl. ............. 528/120; 252/182.13; 252/182.23; 525/504; 525/523

(58) Field of Classification Search ....................... None
See application file for complete search history.

(56) References Cited

U.S. PATENT DOCUMENTS

| 4,751,278 | A  | * | 6/1988 | Brytus ........................ 528/88 |
| 5,246,984 | A  |   | 9/1993 | Darwen et al. |
| 5,350,784 | A  |   | 9/1994 | Darwen et al. |
| 6,566,423 | B2 | * | 5/2003 | Schrotz et al. .............. 523/458 |
| 2002/0072575 | A1 |   | 6/2002 | Schrotz et al. |
| 2004/0077802 | A1 | * | 4/2004 | Scherzer et al. ............. 525/526 |
| 2007/0196612 | A1 | * | 8/2007 | Igarashi ..................... 428/41.3 |

FOREIGN PATENT DOCUMENTS

| CA | 877389 | A | * | 2/1974 |
| EP | 0572915 |   |   | 12/1993 |
| GB | 987422 | A | * | 5/1973 |
| JP | 52-74700 | A | * | 6/1977 |
| JP | 62-177016 | A | * | 8/1987 |
| JP | 2-302425 | A | * | 12/1990 |
| WO | WO 99/28365 |   |   | 6/1999 |

* cited by examiner

*Primary Examiner*—Robert Sellers

(57) ABSTRACT

Curing agent for epoxy resins, comprising
A) 1-99 wt % of an adduct obtainable by reaction of a1) a polyethylene polyamine having up to five nitrogen atoms in the molecule, with a2) a monoglycidylether, wherein the adduct of a1) and a2) is isolated by removing the excessive polyethylene-polyamine, and
B) 99-1 wt % of an amine compound having at least two reactive amine hydrogen atoms in the molecule,
as well as curable compositions additionally comprising an epoxy compound and the use of said curable compositions for the preparation of moulded articles and sheet materials, as well as for applications in the field of adhesives and sealing compounds.

9 Claims, No Drawings

EPOXY RESIN CURING AGENT OF POLYETHYLENE POLYAMINE-MONOGLYCIDYL ETHER ADDUCT AND AMINE COMPOUND

CROSS REFERENCE TO RELATED APPLICATIONS

This application is the National Phase of International Application PCT/EP2006/068194 filed Nov. 7, 2006 which designated the U.S. and which claims priority to European Pat. App. No. 05111293.6 filed Nov. 25, 2005. The noted applications are incorporated herein by reference.

The invention relates to curing agents for epoxy resins comprising

A) at least an adduct obtainable by reaction of a1) a polyethylene polyamine having up to five nitrogen atoms in the molecule, with a2) a monoglycidylether, wherein the adduct is isolated from a1) and a2) by removing the excessive polyethylene polyamine, and B) at least an amine compound having at least one reactive amine hydrogen in the molecule, as well as curable compositions additionally comprising an epoxy compound.

The use of these curable compositions for preparing moulded articles and sheet materials as well as for applications in the field of adhesives and sealing compounds and for epoxy resin mortar is also an object of this invention.

Curable compositions on the basis of amine curing agents and epoxy resins are used in the industry on a large scale for coating and quenching and tempering of metallic and mineral substrates, as adhesive and sealing compounds, as matrix resins, as tool resins or, in general, as casting resins for preparing moulded articles or sheet materials.

In particular, aliphatic, cycloaliphatic or aromatic amines are used as amine curing agents. The mechanic and physical properties of the curable and cured compositions on the basis of these amines, respectively, are sufficient for many applications. In practice, however, these products have disadvantages in many aspects, e.g. surface defects such as lubricating films, adhesives, structures, lumps, cratering and in particular more or less intense hydrate formation. However, these surface defects do not only interfere optically, as for example with a top coat. The surface defects, in particular the hydrate formation, may lead to the intermediate layer adhesion not being sufficient and the subsequently applied top coat peeling off, if the curing agent must be layered, for example in use as first coat. Often, pre-adducts of such amines with epoxy resins are used here. The advantages are in addition to improved surface properties a decreased vapour pressure and thus, also a decreased unpleasant odour and toxicology.

Often however, the disadvantage of these compounds is their high level of viscosity. Larger portions of diluents, often over 40% of the total composition, must be added to be processable at room temperature and lower temperatures. However, this leads to a distinct deterioration of the mechanic properties of the cured duromers. The addition of diluents leads to an additional intense unpleasant odour via emission. These solvents are noxious or toxic to some extent. The environmental impact by the degasing solvents is enormous. Existing solvent is also causing technical problems, in particular by applying of thick layers, e.g. with first coats a disposition of the solvent in the coating is interfering and unwanted.

Thus, the problem of the invention is to provide curing agents for curable compositions on the basis of epoxy resins, which are low viscous at room temperature and processable without or a minor addition of unreactive diluents or solvents, and having a high level of surface properties of the cured duromers, in particular with respect to a preferably low hydrate formation.

According to the invention, this problem is solved by providing a curing agent for epoxy resins, comprising A) 1-99 wt % of at least an adduct obtainable by reaction of a1) a polyethylene polyamine having up to five nitrogen atoms in the molecule, with a2) a monoglycidylether, wherein the adduct of a1) and a2) is isolated by removing the excessive polyethylene polyamine, and B) 99-1 wt % of at least an amine compound having at least one reactive amine hydrogen atom in the molecule.

Preferably, the inventive curing agent merely comprises the components A) and B) with the proviso that both add up to 100 wt %. The inventive curing agent preferably comprises 10-90 wt %, particular preferred 20-80 wt % of component A) and in addition preferably 90-10 wt %, particularly preferred 80-20 wt % of component B), respectively.

The inventive curing agents have comparatively low viscosities and enable processing at room temperature, thus in a range of 10 to 30° C., so that an addition of interfering solvents and/or softening agents may be basically set aside. Even where low viscosities are particularly needed those may be adjusted with less addition of softening agents.

Compared to commercially available curing agents, a significantly faster curing rate results, in particular at low temperatures (10° C.), with comparable processing time (pot life).

For preparing the polyamine adducts A), monofunctional, in particular aromatic glycidylethers such as phenylglycidylether, cresylglycidylether, glycidylether based on distilled cashew nut shell oil, glycidylether based on monoalcohols, styrene oxide and so on are used as adduct component a2). Preferably, phenyglycidylether and cresylglycidylether, in particular cresylglycidylether are used.

Polyethylene amines having at most 5 (five) nitrogen atoms in the molecule are used as amine compound a1). Polyethylenepolyamines such as aminoethylpiperazine, ethylene diamine, diethylene triamine or triethylenetetraamine are preferred. In particular, the compound a1) is selected from ethylene diamine and/or diethylene triamine.

For preparing the isolated polyamine adducts A), the epoxy compound is added to an excess of the amine component under stirring at 60° C. to 80° C. and after the reaction has completed, the excess of the amine compound is removed by distillation, if necessary in vacuum. Thereby, the free residual content of the amine should be very low. A residual content of the amine of <5% is preferred, particularly preferred is <1%.

Basically, any amines having at least one, preferably two reactive amine hydrogen atoms in the molecule such as heterocyclic amines such as piperazine, N-aminoethylpiperazine; cycloaliphatic amines such as isophoron diamine, 1,2-(1,3;1,4)-diaminocyclohexane, aminopropyl-cyclohexyl amine, tricyclododecan diamine (TCD); araliphatic amines such as xylylene diamine; optionally substituted aliphatic amines such as ethylene diamine, propylene diamine, hexamethylenediamine, 2,2,4(2,4,4)-trimethylhexamethylene diamine, 2-methylpentamethylene diamine; ether amines such as 1,7-diamino-4-oxaheptane, 1,10-diamino-4,7-dioxydecane, 1,14-diamino-4,7,10-trioxatetradecane, 1,20-diamino-4,17-dioxy-eicosan and in particular 1,12-diamino-4,9-dioxadodecane may be used as amine compound B). Likewise, ether diamines based on propoxylated diols, triols and polyols ("Jeffamine® ex Huntsman) may be used. Furthermore, polyalkylene polyamines such as diethylene triamine, triethylene tetramine, dipropylene triamine, tripropylene tetramine as well as high molecular amines or addition or condensation products containing free amine hydrogen, in particular Mannich bases may be used.

Preferably, isophoron diamine, trimethylhexamethylene diamine, aminoethylpiperazine, xylylene diamine and/or ether amines are used. Particularly preferred is aminethylpiperazine.

A further object of the invention is a curable composition characterized in that it comprises at least a curable epoxy compound, an inventive curing agent according to one of the claims 1 to 6 and optionally one or more adjuvants and additives used in the epoxy resin technique.

The epoxy compounds used for the curable compositions according to the invention are commercial products having more than one epoxy group per molecule on average, which are derived from monovalent and/or multivalent and/or multinuclear phenols, in particular bisphenols as well as novolaks such as bisphenol-A and bisphenol-F-diglycidylether. A substantial enumeration of these epoxy compounds is to be found in the handbook "Epoxidverbindungen und Epoxidharze" of A. M. Paquin, Springer Verlag Berlin, 1958, Chapter IV, as well as in Lee & Neville, "Handbook of Epoxy Resins", 1967, chapter 2.

Compositions of two or more epoxy compounds may be used as well.

According to the invention compositions of glycidylethers based on bisphenol-A, bisphenol-F or novolaks with so-called reactive diluents such as monoglycidylethers of phenols or glycidylethers based on mono- or multivalent aliphatic or cycloaliphatic alcohols are preferred. Examples of such reactive diluents are e.g. phenlyglycidylether, cresylglycidylether, p-tert.-butylphenylglycidylether, butylglycidylether, $C_{12}$-$C_{14}$ alcoholgylcidylether, butanediglycidylether, hexanediglycidylether, cyclohexanedimethylglycidylether or glycidylether based on polyethylene- or polypropylene glycols. If necessary, the viscosity of the epoxy resins may be further reduced by the addition of such reactive diluents. In general, the addition should not be more than 30 wt %, preferably at most 20 wt % based on the epoxy resin, as otherwise the mechanical data may deteriorate too much.

Preferably, the mixing ratio of inventive curing agents to epoxy resin is chosen equivalently, i.e. one equivalent epoxy per equivalent amino is used. However, depending on the intended use and the desired final properties of the cured duromers, an excess or subplus of the curing agent component may be used.

One object of the invention is the use of the inventive curable compositions for the preparation of moulded articles and sheet materials, as well as in applications in the adhesive or sealing compound area and for epoxy resin mortar.

A further object of the invention are the cured products obtainable by curing of such a composition. The co-used epoxy resins are curable with the inventive curing agents in a hot and cold manner (room temperature).

The curing of the epoxy resins may occur in the presence of further additives such as additives and adjuvants common in epoxy resin technique. To be noted are, for example, gravels, sands, silicates, graphite, silica, talc, mica etc. in the particle size distributions as common used in this area. Further, pigments, dyes, stabilizers, levelling agents, plasticizers, non-reactive extender resins, softening agents, accelerators may be used.

Further, the curable compositions may comprise curing agents common in epoxy resin technique, in particular amine curing agents such as co-curing agents.

In general, the inventive compositions may be used as casting resins for the preparation of cured products such as moulded articles and sheet articles and may be used, for example, in the adhesive or sealing compound area, thus for example, as adhesive, as matrix resins, as tool resins or as coating agents, adjusted to the particular application area.

EXAMPLES

The viscosity values each as indicated at 25° C. are determined with a Haake rotation viscometer VT 550 according to the manufacturer's specifications.

Example 1

Preparation of an Isolated Adduct A

A reaction vessel was charged with 309 g diethylene triamine (3 mole). After heating to approx. 60° C., 185 g cresylglycidylether (1 equivalent epoxy) were added within approx. 60 min. The temperature rose to 90° C. Subsequently, the reaction product was heated to 260° C. and the excessive amine was removed in vacuo (<1 mbar). Distillate: 206 g (2 mole DETA). Viscosity: 8500 mPa·s. Theoretical amine equivalent: approx. 72.

Example 2

Preparation of an Isolated Adduct A

A reaction vessel was charged with 180 g ethylene diamine. After heating to approx. 60° C., 185 g cresylglycidylether (1 equivalent epoxy) were added within approx. 60 min. The temperature rose to 90° C. Subsequently, the reaction product was heated to 260° C. and the excessive amine was removed in vacuo (<1 mbar). Distillate: 120 g (2 mole ethylene diamine). Viscosity: 7600 mPa·s. Theoretical amine equivalent: approx. 82.

Example 3

700 g of the adduct of Example 1 and 300 g isophorone diamine were homogenized at 60° C. to 70° C.

Viscosity: 900 mPa·s. Theoretical amine equivalent: approx. 59.

Example 4

800 g of the adduct of Example 1 and 200 g xylylene diamine were homogenized at 60° C. to 70° C.

Viscosity: 1250 mPa·s. Theoretical amine equivalent: approx. 58.

Example 5

700 g of the adduct of Example 2, 150 g isophorone diamine and 150 g trimethylhexamethylene diamine were homogenized at 60° C. to 70° C.

Viscosity: 570 mPa·s Theoretical amine equivalent: approx. 63.

Example 6

700 g of the adduct of Example 2 and 300 g Jeffamin D-230 (polyether diamine) were homogenized at 60° C. to 70° C.

Viscosity: 860 mPa·s. Theoretical amine equivalent: approx. 74.

Example 7

700 g of the adduct of Example 2 and 200 g aminoethylpiperazine and 100 g benzylalcohol were homogenized at 60° C. to 70° C.

Viscosity: 620 mPa·s. Theoretical amine equivalent: approx. 70.

Comparative Example 8

A non-isolated adduct is prepared for comparison with Example 1 and for use with Example 9 as follows:

A reaction vessel was charged with 103 g diethylene triamine (1 mole). After heating to approx. 60° C., 185 g cresylglycidylether (1 equivalent epoxy) were added within approx. 60 min. The temperature rose to 90° C. Subsequently, the mixture was stirred for 30 min. Viscosity: 8800 mPa·s. Theoretical amine equivalent: approx. 72.

Example 9

Comparative Example to Example 3

A formulation using the non-isolated adduct of Comparative Example 8 for comparison with Example 3 was prepared as follows:

700 g of the adduct of Comparative Example 8 and 300 g isophorone diamine were homogenized at 60° C. to 70° C.

Viscosity: 960 mPa·s. Theoretical amine equivalent: approx. 59.

Application Examples

Curing Rate and Processing Time (Pot Life)

The determined shore-hardness D at 10° C. and gel times with the epoxy resin Araldite® GY 783[1]) are listed in Table 1 below:

TABLE 1

| Curing agent | M.R.[2]) | Shore D after hours at 10° C. 24 h/48 h/72 h | Gel time [min] |
|---|---|---|---|
| Example 3 | 31 | 58/68/76 | 41 |
| Example 4 | 30 | 65/73/77 | 47 |
| Example 5 | 33 | 52/60/78 | 51 |
| Example 6 | 39 | 35/56/74 | 60 |
| Example 7 | 39 | 68/75/77 | 48 |
| Example 9 (C) | 31 | 55/64/75 | 42 |
| Aradur ® 43[3]) | 60 | 0/48/65 | 45 |

[1])Araldite ® GY 783 is a bisphenol-A/bisphenol-F resin-mixture modified with $C_{12}/C_{14}$-glycidylether having a viscosity of approx. 1000 mPa · s (23° C.) and a epoxy equivalent weight of approx. 190;
[2])M.R. = mixing ratio = gram curing agent per 100 gram Araldite ® GY 783;
[3])Polyamine adduct containing a softening agent. Standard curing agent for coatings and floor coverings (Huntsman);
C: Comparative Example The surface quality, being achieved in each case, with respect to hydrate formation is listed in the following Table 2:

The comparison of the surfaces with respect to the hydrate formation was carried out at three different environmental conditions, respectively, that is:

a) 5° C./90% r.h. (r.h.=relative humidity), b) 10° C./80% r.h., and c) 23° C./50% r.h.

The evaluation of the results is carried out on an evaluation scale using evaluation points, which are assigned from 0 (=very good) and 10 (=insufficient):

TABLE 2

| Curing agent/ Condition | a) | b) | a) | sum |
|---|---|---|---|---|
| Example 3 | 2 | 0 | 0 | 2 |
| Example 4 | 1-2 | 0 | 0 | 1-2 |
| Example 5 | 1 | 0 | 0 | 1 |
| Example 6 | 3 | 1 | 0 | 4 |
| Example 7 | 1 | 0 | 0 | 1 |
| Example 9 | 8 | 3 | 0 | 11 |
| Aradur ® 43[3]) | 4 | 1 | 0 | 5 |

Discussion of the Results:

The curing rates of the inventive curable compositions are very high at 10° C., whereas the processing times are comparatively long. A significant faster curing at comparable or longer pot time can be observed by direct comparison between the inventive Examples and the comparative Example Aradur® 43.

Such curing behaviour is desirable in practice, as, on one side, the fabricator has sufficient time for applying the curable formulation and, on the other side, in the coating sector, this curing assures that the coating is accessible shortly afterwards, i.e. can be walked on, and that the coating can be finished or worked on shortly afterwards.

Besides the excellent curing rate at comparably long pot time, a very good level in surface quality could be observed.

In particular, the resistance against hydrate formation should be mentioned, as this feature plays an important role not only optically, as for example for a top coat, but in particular with respect to the adhesion of the intermediate layer.

The hydrate formation can lead to insufficient adhesion of the intermediate layer and to a stripping of the applied top coat.

Comparing the inventive Examples, in particular for Example 3 (a formulation based on the inventive, i.e. isolated adduct according to Example 1) with Comparative Example 9 (a formulation analogue to Example 3, however being prepared from the non-isolated adduct of Example 8), clearly reveals that the preceding isolation of the inventive adducts, surprisingly leads to a distinct decrease of hydrate formation.

The invention claimed is:

1. Curing agent for epoxy resins consisting of,
   A) 1-99 wt % of an adduct obtained by reaction of a1) ethylene diamine or polyethylene polyamine having up to five nitrogen atoms in the molecule, with a2) a monoglycidylether, wherein the adduct of a1) and a2) is isolated by removing the excessive ethylene diamine or polyethylene polyamine, and
   B) 99-1 wt % of at least one amine compound having at least one reactive amine hydrogen atom in the molecule selected from the group consisting of piperazine, N-aminoethylpiperazine, isophorone diamine, 1,2-diaminocyclohexane, 1,3-diaminocyclohexane, 1,4-diaminocyclohexane, aminopropylcyclohexyl amine, tricyclododecane diamine, xylene diamine, propylene diamine, hexamethylene diamine, 2,2,4-trimethylhexamethylene diamine, 2,4,4-trimethylhexamethylene diamine, 2-methylpentamethylene diamine, 1,7-diamino-4-oxaheptane, 1,10-diamino-4,7-dioxydecane, 1,14-diamino-4,7,10-trioxatetradecane, 1,20-diamino-4-17-dioxyeicosane, 1,12-diamino-4,9-dioxadodecane, ether diamines based on propoxylated diols, triols and polyols, dipropylene triamine and tripropylene tetramine.

2. Curing agent according to claim 1, characterized in that said compound a1) is selected from ethylene diamine and diethylene triamine.

3. Curing agent according to claim 1, characterized in that said compound a2) is an aromatic monoglycidylether.

4. Curing agent according to claim 3, characterized in that said compound a2) is phenylglycidylether or cresylglycidylether.

5. Curing agent according to claim 1, characterized in that said amine compound B has at least two reactive amine hydrogen atoms in the molecule.

6. Curing agent according to claim 1, characterized in that said amine compound B) is isophorone diamine, N-aminoethylpiperazine, trimethylhexamethylene diamine, xylylene diamine or with ether diamines based on propoxylated diols, triols and polyols.

7. Curable composition comprising a curable epoxy compound, a curing agent according to claim 1 and optionally additives and adjuvants.

8. Curable composition according to claim 7 characterized in that the epoxy compound is bisphenolglycidylether or epoxynovolak and is diluted with a reactive diluent.

9. Cured product obtained by curing of a composition according to claim 7.

* * * * *